US008407174B2

(12) United States Patent
Martin Lopez et al.

(10) Patent No.: US 8,407,174 B2
(45) Date of Patent: Mar. 26, 2013

(54) METHOD FOR OPTIMIZING THE SCANNING PROCESS OF A MOBILE TERMINAL (75) Inventors: Miguel Martin Lopez, Ludwigshafen (DE); Albert Vidal, Heidelberg (DE); Claudia Villalonga, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 638 days.

(21) Appl. No.: 12/666,862

(22) PCT Filed: Jun. 26, 2007

(86) PCT No.: PCT/EP2007/005643
§ 371 (c)(1),
(2), (4) Date: Dec. 28, 2009

(87) PCT Pub. No.: WO2008/000298
PCT Pub. Date: Dec. 31, 2008

(65) Prior Publication Data
US 2010/0185575 A1    Jul. 22, 2010

(51) Int. Cl.
*G06F 17/00* (2006.01)
*G06N 5/02* (2006.01)
(52) U.S. Cl. ........................................................ 706/46
(58) Field of Classification Search .................. 706/46, 706/45, 62
See application file for complete search history.

(56) References Cited

U.S. PATENT DOCUMENTS

| 2002/0126701 A1* | 9/2002 | Requena ........................ 370/469 |
| 2006/0227745 A1* | 10/2006 | Olvera-Hernandez et al. ........................ 370/331 |
| 2007/0025294 A1* | 2/2007 | Kim et al. ..................... 370/331 |
| 2007/0105589 A1* | 5/2007 | Lu ............................... 455/556.2 |
| 2007/0118604 A1* | 5/2007 | Costa Requena ............ 709/206 |
| 2007/0124472 A1* | 5/2007 | Requena ....................... 709/225 |

FOREIGN PATENT DOCUMENTS

| EP | 1610507 | 12/2005 |
| JP | 2006217178 A | 8/2006 |
| WO | 98/27766 | 6/1998 |
| WO | 99/62285 | 12/1999 |
| WO | 2005/101887 | 10/2005 |
| WO | 2006088318 A1 | 8/2006 |

OTHER PUBLICATIONS

Rouil et al, "Effects of IEEE 802.16 link parameters and handover performance for select scenarios", Presented at IEEE 802.21 session # 13 in Denver Colorado, Date Submitted: Feb. 10, 2006.*
Albanese, "Handover issues in heterogeneous environments Vertical handover between WiMAX and WiFi networks", Jan. 3, 2006.*

(Continued)

*Primary Examiner* — Jeffrey A Gaffin
*Assistant Examiner* — Ilya Traktovenko
(74) *Attorney, Agent, or Firm* — Young & Thompson (57) ABSTRACT A method for optimizing the scanning process of a mobile terminal, the scanning process being performed by the mobile terminal in order to discover an available network to which a connection is possible, wherein at least a part of existing networks is registered to a server, wherein the server provides its information regarding the registered networks to the mobile terminal, is characterized in that the scanning period of the mobile terminal is dynamically adjusted on the basis of information provided by the server.

19 Claims, 4 Drawing Sheets

OTHER PUBLICATIONS

Chung et al, "Traffic distribution schemes for multi-homed mobile hotspots", IEEE 61st Vehicular Technology Conference, 2005, VTC 2005, Spring 2005, Date of Conference: May 30-Jun. 1, 2005.*

Jing et al, "On-Demand Multipath Routing Protocol with Preferential Path Selection Probabilities for MANET", Proceedings of the 20th International Conference on Advanced Information Networking and Applications (AINA'06), 2006.*

IEEE P802.21/D00.05, "Draft IEEE Standard for Local and Metropolitan Area Networks: Media Independent Handover Services", IEEE P802.21™/D00.05, Jan. 2006.*

Iera et al, "End-to-End QoS Provisioning in 4G with Mobile Hotspots", IEEE Network o Sep./Oct. 2005.*

Perera et al, "An Implementation and Evaluation of a Mobile Hotspot", WMASH'05, Sep. 2, 2005.*

Kotsakis, "A Geo-spatial Solution for Enhancing the Information Support to Mobile Users", Sep. 2001.*

Vivek Gupta, Michael Williams, Xiaoyu Liu, Qiabing Xie: "Extract from IEEE P802.21/D05.02, Draft Standard for Local and Metropolitan Area Networks: Media . Independent Handover Services" [Online] Jun. 19, 2007, IEEE, Internet Publication, XP002477830.

International Search Report dated May 15, 2008, in PCT application.

Draft Text for Media Independent Handover Specification, IEEE 802.21 Media Independent Handover Services, http://www.ieee802.org/21/, Mar. 2005.

Japanese Office Action, dated Jan. 18, 2012, from corresponding JP application.

* cited by examiner

METHOD FOR OPTIMIZING THE SCANNING PROCESS OF A MOBILE TERMINAL

BACKGROUND OF THE INVENTION

1. Field of the Invention

The present invention relates to a method for optimizing the scanning process of a mobile terminal, the scanning process being performed by the mobile terminal in order to discover an available network to which a connection is possible, wherein at least a part of existing networks is registered to a server, wherein said server provides its information regarding the registered networks to the mobile terminal.

2. Description of the Related Art

In recent years several types of wireless communication systems have been developed. For example, wireless local area networks (WLAN) are widely spread nowadays, cellular networks, such as Universal Mobile Telecommunication Systems (UMTS), have gained paramount importance, and, most recently, WiMAX (defined as Worldwide Interoperability for Microwave Access) has been developed as a standard-based technology enabling the delivery of last mile wireless broadband access. Each of these systems provides different types of services and specific applications.

According to the existing different types of wireless communication systems, mobile terminals nowadays support multiple network interfaces, with WiFi, UMTS, GSM and Bluetooth already available in the market. While connection to the GSM/UMTS network is neatly arranged by network operators, other networks, such as WiFi and Bluetooth, require continuous scanning of the mobile terminal to guarantee a reasonable percentage of connection time. In order to discover available networks, the terminal needs to perform a technology-specific scan function. In general, this results in such intensive battery consumption, that the mobile terminals functionality is drained at unacceptable rates.

In the case of networks where the terminal receives advertisements (for instance, beacons), such as in WiFi, the scanning time may be considered as the period in which the wireless card is listening on the radio link and can receive such advertisements. During the rest of the time, the device is considered as non listening. When a protocol does not provide any advertisements, such as Bluetooth Inquiry or WiFi active Probe Request modes, a scan is considered as the initiation of the scanning process.

Certain strategies have been developed, such as the MIH (Media Independent Handover), which communicate available networks within a given area to mobile terminals. Consequently, the terminal does not have to perform a scanning process, but can directly attempt to connect to the known networks in its vicinity. However, devices that are not MIH-enabled need to periodically scan for available networks, resulting in rapid battery consumption as mentioned above. MIH-enabled devices, on the other hand, can save battery and scanning time when using the information regarding available networks provided by the MIH service. In the context of the MIH service, this information is usually provided by an information server (IS) to which existing networks are registered.

However, there will always be situations in which mobile devices can not use the information provided by the information server, either because the information is incomplete or outdated. This may be due to the fact that networks that do exist have not been registered yet in the IS. In such cases, the terminal is reduced to non-MIH functionality, which typically involves periodical scans according to the policies implemented in the terminal. Such a situation can be described as a non-MIH operation of MIH-enabled devices, in which terminals act as they were not MIH-enabled, i.e. they have to periodically scan in order to discover available networks to which connection is possible.

SUMMARY OF THE INVENTION

It is therefore an object of the present invention to improve and further develop a method of the initially described type for optimizing the scanning process of a mobile terminal in such a way that by employing mechanisms that are readily to implement a high level of connectivity with a power consumption as low as possible is achieved.

In accordance with the invention, the aforementioned object is accomplished by a method characterized in that the scanning period of the mobile terminal is dynamically adjusted on the basis of information provided by the server.

According to the invention is has been recognised that by using information regarding available networks, which is provided by a server to which existing networks can be registered, a dynamic adaptation of the scanning period of a mobile terminal can be performed. By specifying the scanning period depending on information provided by the server regarding available networks, at least the same level of connectivity as with traditional scanning methods can be achieved, but with an optimized power consumption and, therefore, with an increased battery life.

The method according to the invention can be suitably applied, for instance, in MIH environments according to the IEEE 802.21 standard. In such a case, the MIH Information Server (IS) would function as the server to which existing networks can register and which provides its information regarding the registered networks to the mobile terminal. However, it is to be understood that the invention is applicable in any scenario in which a server is provided to which networks can register, and wherein said server is enabled to provide information regarding registered networks to mobile terminals. Consequently, when the invention is described with respect to MIH in the following, this reference is to be understood as an exemplary reference only, and it is to be expressly pointed out that it is in no way intended to limit the invention in any way.

In an especially advantageous embodiment a probability $P_R$ of a network to be registered in the server is estimated and the mobile terminal's scanning period is determined on the basis of said estimated probability $P_R$. When $P_R$ is the probability of a particular network being registered in the server, $P_R$ gives, in other words, the percentage of networks that are known to the server or, in the special application scenario of MIH technology, to the MIH Information Server (IS), respectively. $P_R$ is always lower as one, or equal to one in the case that all existing networks within a specified area are known to the server. To optimally adjust the scanning period of a terminal, the scanning period is shortened the lower the estimated probability value $P_R$. The estimation of the probability value $P_R$ may be performed either by each terminal on the basis of the information received from the server or by the server itself which constitutes a more centralized approach. In the latter case it may be provided that the probability values $P_R$ are transmitted from the server to mobile terminals upon special requests from the part of the terminals.

In a further advantageous embodiment users are enabled to report networks to the server, the reports being employed by the server to update its knowledge of existing networks, and the probability $P_R$ is dynamically recalculated by the server on the basis of said network reports received form users. By enabling users to send messages to the server in order to report networks to the server, a high degree of freshness, richness, and completeness of information stored in the server is achieved. The communication nodes updating the information in the server may be individual users, preferably costumers of the operator of the server, or other network operators. By allowing users to conduct the updates of the server by themselves, the system is very dynamic and loyal to the current state of the network with the information in the server being always fresh and thorough due to periodically updates by users in the field.

In a concrete embodiment, it may be provided that the server employs reports on the part of users only after having performed a plausibility check according to configurable criteria. In other words, the server decides about the acceptance of messages received form a user/communication node according to configurable criteria. Only in cases in which specified criteria are fulfilled, the server employs the content of a message in order to conduct an update operation. Otherwise the message may be discarded. For example, the plausibility check may include a measurement to identify a network reported by user as a moving network, that is, a network that is not affixed to a static location. Additionally, mechanisms may be implemented to prevent simple spam from being reported. Furthermore, the configurable criteria may, for example, include the kind of authorization of the communication node, i.e. the server may be configured in such a way that only messages from authorized communication nodes are further processed. The authorization may be due to the fact that the respective communication node is registered as a customer of the operator which is responsible of managing the server.

In addition to authorization issues, the server may conduct further plausibility checks. For example, the server may use information forwarded to it by a communication node for an update only in such cases in which it receives a configurable number of messages from different communication nodes containing the same (or essentially the same) readings within a configurable time period. In reverse this means, that an isolated message will be condemned as untrustworthy. For example, if a communication node reports on a network not yet registered in the server, the server will attend to the registration of this network only if the existence of this network is confirmed by other communication nodes from the same geographical region. This mechanism strongly supports the detection of intentionally faked information from certain users.

Regarding the adjustment of the probability $P_R$ it may be provided, that the probability $P_R$ is decreased each time the server receives a user report (which, where appropriate, has being checked and qualified as being trustworthy) regarding a network of which the server had not yet previous knowledge. By decreasing the probability $P_R$ it is taking into consideration that, obviously, there are (many) existing networks which are not yet registered to the server.

On the other hand, the probability $P_R$ may be slightly increased towards the value 1, if the server receives no user reports of yet unknown networks over a long period of time. In such a case, it is very likely that all existing networks are already registered to the server. However, the probability $P_R$ may be decreased in the case the server does not receive any user reports at all over a long period of time. By this means one can take into account the lack of freshness of the information stored in the server regarding available networks. The time period after which the probability $P_R$ will be increased/decreased may be implemented as a configurable parameter.

An additional parameter to be considered in the calculation of the probability $P_R$ may include a prediction of the amount of unknown networks. Such a prediction could be made, for instance, by means of machine learning techniques.

With respect to a high accuracy it proves to be advantageous to perform the estimation of the probability $P_R$ specific to a certain geographic area. The smaller the geographical area for which a probability value is generated, the better is the information for an individual mobile terminal which will choose, in order to adjust its scanning period, a probability value that fits to the geographic area where the mobile terminal is currently located. The degree of granularity may be determined depending on the positioning mechanism provided by the server. The areas will usually be bigger than the maximum resolution of the positioning system.

With respect to an effective storage of the individual probabilities, it may be provided that the individual probabilities $P_R$ for each specified area are stored by the server in a spatial database or by means of the GIS (Geo Information Service) storage mechanisms.

Advantageously, for each specified area an individual probability $P_R$ is calculated for each of the different access technologies. By this means it is possible for a mobile terminal which, for instance, exclusively searches for a WiFi network (maybe because the terminal supports only such a network interface) to adjust its scanning period on the basis of a probability $P_R$ value which takes into consideration only the local situation regarding existing WiFi networks.

It may be provided that a probability $P_R$ that is valid for a certain area is also transmitted to areas neighboured to said area. The user is thus enabled to change his geographical position to a neighboured area if he finds that the probability $P_R$ is higher in that area and, therefore, a connection to a network may be established by applying a longer scanning period and, consequently, by consuming less battery power. Moreover, it can be provided that the user is enabled to choose whether he wishes to receive a probability value $P_R$ that is averaged for a large area, or rather fine grained values for a set of smaller, adjacent areas.

Advantageously, it may be provided that the calculated probability value $P_R$ is transmitted to the mobile terminal and that the scanning period $T_S$ is calculated on the part of the mobile terminal on the basis of the received probability value $P_R$. Alternatively, it is possible that the scanning period $T_S$ is calculated by the server or by an external application and that the calculated scanning period $T_S$ is transmitted to the mobile terminal.

Regarding the transmission of the probability $P_R$ estimations and/or scanning period $T_S$ calculations from the server to mobile terminals the MIIS (Media Independent Information Service) as defined in the IEEE 802.21 Standard may be employed. To this end, a new Information Element (IE) may be added to the MIIS. There are no further problems on doing that, since the 082.21 protocol reserves certain number of bits with the purpose of allowing vendors and operators to add their proprietary IEs. For example, in this context a new IE called "Networks Knowledge Estimation" could be introduced. The process of how this information is inserted in the frame and sent to the mobile nodes may be just following the normal 802.21 rules.

It is noted once again that the methods as described herein are not exclusive of MIH as defined in the IEEE 802.21 specification. It becomes clear to someone skilled in the art that the method as described above applies to any existing or upcoming protocol with similar mechanisms or functionalities.

There are several ways how to design and further develop the teaching of the present invention in an advantageous way. To this end it is to be referred to the following explanation of preferred embodiments of the invention by way of example, illustrated by the figures. In connection with the explanation of the preferred embodiments of the invention by the aid of the figures, generally preferred embodiments and further developments of the teaching will we explained.

DETAILED DESCRIPTION OF THE INVENTION

Figure 1:
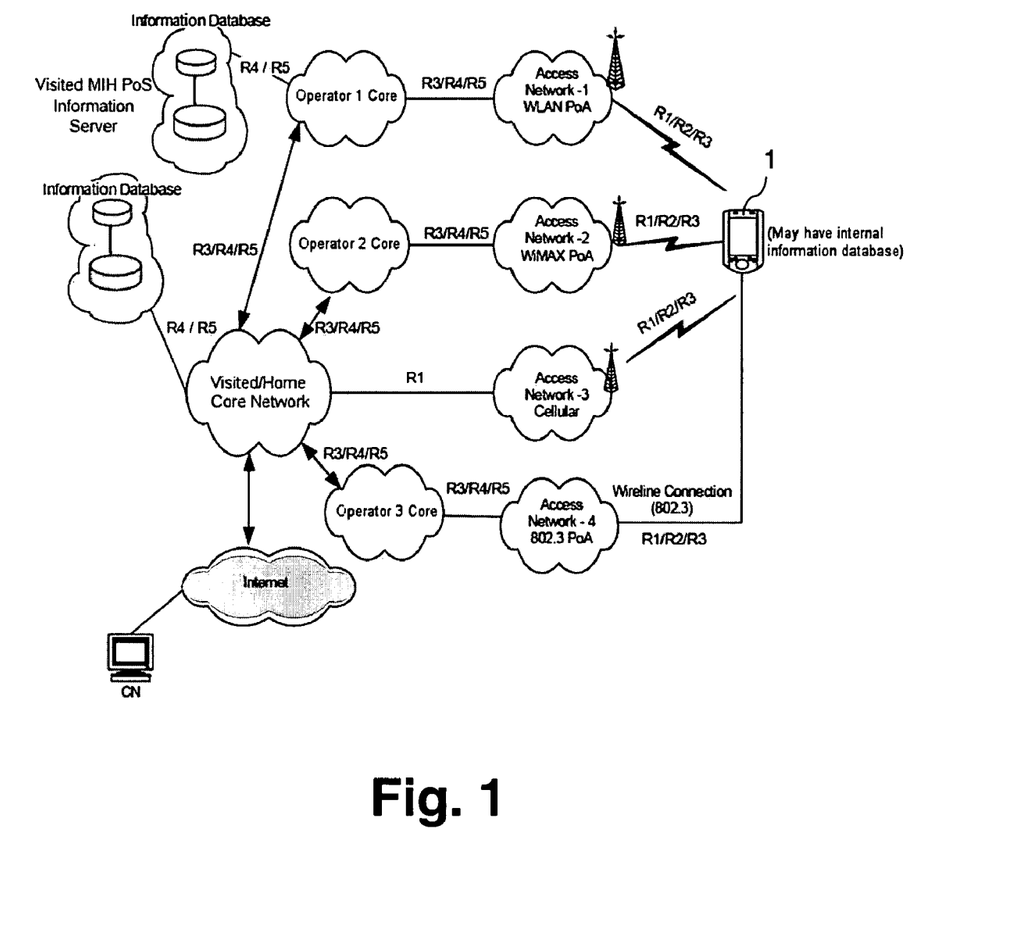
FIG. 1 is a schematic view of a typical network architecture illustrating the MIH communication model in general.

FIG. 1 illustrates a network model including MIH services in which the method according to the invention is generally applicable. More particularly, FIG. 1 gives an illustration of the MIH communication reference points in a typical network architecture. The model includes an MIH capable communication node 1 which supports multiple wired and/or wireless access technology options.

The model shown in FIG. 1 includes four exemplary access networks 1-4. The access networks 1, 2 and 4 are connected to a core network (Operator 1-3 Core, respectively), whereas access network 3 is a cellular network which is coupled to a core network that is labelled as Visited/Home Core Network. In this context the terms visited and home indicate the provisioning service provider or enterprise. Any of the illustrated networks can be either a Visited or Home Network depending on the relation of the operator to the provisioner of the communication node 1. The Operator 1-3 Core each might represent a service provider or corporate intranet provider.

Network providers offer MIH services in their access networks (Access Networks 1-4) to facilitate handover into their networks. Each access technology either advertises its MIH capability or responds to MIH service discovery. Each service provider for the access network allows access to one or more MIH Points of Service (PoS). These PoS may provide some or all of the MIH services as determined during MIH capabilities discovery. The location or node of an MIH PoS is not fixed by the standard. The PoS location may vary based on operator deployment scenario and the technology-specific MIH architecture.

An MIH PoS may reside next to or be co-located with the point of attachment (PoA) in the access network (in this regard Access Networks 1, 2, and 4 are typical). Alternatively the PoS may reside deeper inside the access or core network (in this regard Access Network 3 is typical). As shown in FIG. 1, the MIH entity in the communication node 1 communicates with MIH network entities either by R1, R2 or R3 over any access network. According to the 802.21 the communication reference points R1-R5 shown in FIG. 1 are defined as follows:

R1 refers to MIHF (Media Independent Handover Function is a functional implementation of MIH services as defined in the 802.21 specification) procedures between the MIHF on the communication node 1 and the MIH PoS on the Network Entity of its serving PoA.

R2 refers to MIHF procedures between the MIHF on the communication node 1 and the MIH PoS on the Network Entity of a candidate PoA. Candidate PoAs are PoAs that the communication node 1 is aware of but not currently attached to; it becomes the target PoA if a handover eventually occurs. R1 and R2 may encompass communication interfaces over both L2 and L3 and above.

R3 refers to MIHF procedures between the MIHF on the communication node 1 and the MIH PoS on a non-PoA Network Entity. R3 may encompass communication interfaces over L3 and above and possibly L2 transport protocol like Ethernet bridging, MPLS, etc.

R4 refers to MIHF procedures between an MIH PoS in a Network Entity and an MIH non-PoS instance in another Network Entity. R5 refers to MIHF procedures between two MIH PoS instances in distinct Network Entities. R4 and R5 may encompass communication interfaces over L3 and above. MIHF content passed over R1-R5 may be related to MIIS (Media Independent Information Service), MIES (Media Independent Event Service), or MICS (Media Independent Command Service).

The interaction of visited and home network could be either for control and management purposes or for data transport purposes. It is also possible that due to roaming or SLA agreements, the home network may allow the communication node 1 to access the public Internet directly through a visited network. As illustrated, two MIH network entities may communicate with each other via R4 or R5 reference connections. The MIH capable PoA may also communicate with other MIH network entities via R3 and R4 reference points. The MIH capable communication node 1 could have a MIH communication with other PoA in the candidate access networks via R2 reference points to obtain information services about the candidate network.

With regard to the MIH Information Service (MIIS) the providers offer access to their information server located in a MIH PoS node (upper far left). The operator provides the MIIS to communication nodes so they can obtain pertinent information including but not limited to new roaming lists, costs, provider identification information, provider services, priorities and any other information that would enable to select and utilize services. It is possible for the communication node 1 to be pre-provisioned with MIIS data by its provider. Also possible is for the communication node 1 to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server.

With regard to the MIH Command Service (MICS) the Information Database (far left, mid-way down) depicts a command service PoS. The communication node's 1 MIHF typically communicates with this server using a layer three transport.

As mentioned above, the 802.21 standard provides, amongst several other features, a mechanism to communicate available networks to a terminal in a given area, and so, the terminal does not need to scan but directly attempt to connect to the known networks in its vicinity.

While MIH goes a long way to spare the terminal certain scans, it is still common to be in a situation where no networks are available, either because they are not previously registered on the MIH Information Service, or because the information is outdated. In these cases, the terminal is reduced to non-MIH functionality, which in the following is called non-MIH operation of MIH-enabled devices. In these situations (or when a terminal is not MIH-enabled at all) the terminal typically has to scan periodically according to the policies implemented in the terminal in order to detect the available networks.

Figure 2:
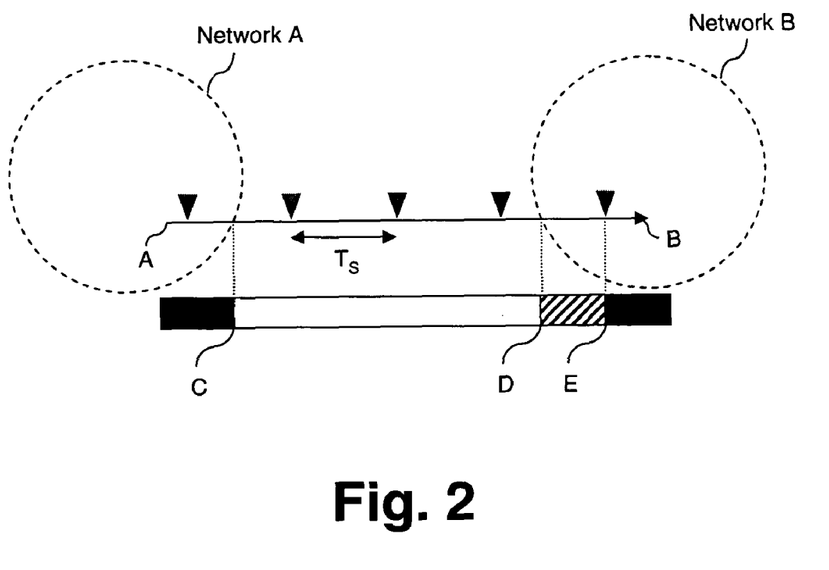
FIG. 2 is a schematic illustration of a static network search process according to the state of the art with a long scan period.
Figure 3:
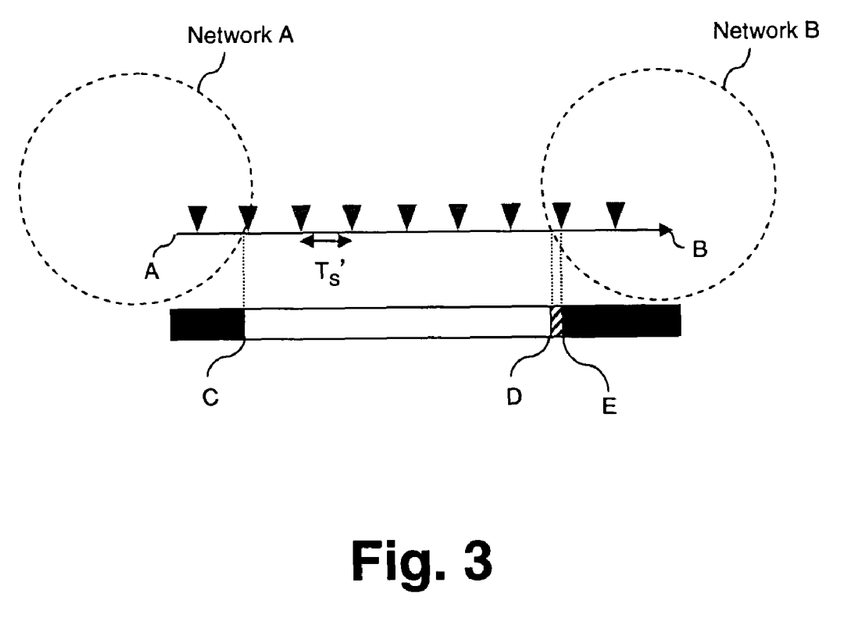
FIG. 3 is a schematic illustration of a static network search process according to the state of the art with a short scan period.

FIG. 2 and FIG. 3 illustrate this situation for the case of a long scanning period (low scan frequency in FIG. 2) and a short scanning period (high frequency scans in FIG. 3). In both cases the user who moves from point A to point B leaves the coverage area (indicated by the dashed line circle) of network A, and becomes suddenly disconnected. This happens at point C. Due to lacking information on available networks, either because of being not MIH-enabled or because of being MIH-enabled, but in a non-MIH operation mode, the mobile terminal sets on a periodical scan which is indicated by the triangles. The scanning period $T_S$ in FIG. 2 has been chosen much longer than the scanning period $T_S'$ in FIG. 3, i.e. the time interval between two subsequent scans is longer in the embodiment of FIG. 2 than in the embodiment shown in FIG. 3.

After entering the coverage area of network B (at point D), the next scan (at point E) detects the network. As can be obtained from FIGS. 2 and 3, in the case of a long scan period the terminal performs only 5 scans between the disconnection from network A and connection to network B. However, the terminal is not aware of network B, until the next scan after having entered the coverage area of network B occurs. This results in a long interval with no connection, as indicated by the stripy area, in spite of the network being available. In a worse case scenario, the scan period $T_S$ could be so long that the user could pass through network B without detecting it, which obviously is not the desired behaviour.

In the case of the shorter scan period $T_S'$ of FIG. 3, network B is discovered much earlier after having entered network B, however, at the cost of many more scans. This results in faster battery depletion. Thus, a clear trade-off between battery consumption and connectivity time is to be observed.

Statistically, the expected wasted time (represented by the stripy area in FIG. 2 and FIG. 3, respectively), defined as the average time until the network is discovered, once it becomes available, is:

$$E_{wasted} = T_S/2,$$

where $T_S$ is the scanning period. The longer the scanning period, the bigger the wasted time, i.e. the time the mobile terminal is not connected although a connection would be available. In the general formula it is assumed that the networks are uniformly randomly distributed Now the case of MIH is considered, in which Network B is registered in the Information Service. In this case, the terminal already knows the whereabouts of Network B, and does not need to perform any scan. Furthermore, as soon as it enters the area where network B is known to be available, it will immediately connect. This is an optimal solution, according to which a minimum number of scans is realized, resulting in the shortest possible wasted time. However, it is to be considered the stretch with no networks. The terminal knows that MIH doesn't have information of any network being available there, but it has no way of checking. If it is intended to provide connectivity for as long as possible, one will still have to scan.

This results in a hybrid scheme, where the terminal does not scan when near a known network, but performs regular scans when no network is known in the area. In this case, the wasted time is the same as already described above when the network is not known to MIH, and 0 (or non significant) when the network is registered in the MIH information server. This is expressed as:

$$E_{wastedMIH} = (P_R \cdot 0) + [(1-P_R) \cdot T_S/2] = (1-P_R) \cdot T_S/2,$$

wherein $P_R$ is the probability that a particular network is registered in the Information Service of MIH or, in other words, the percentage of networks known to MIH. $P_R$ is lower or equal to one and, consequently, $1-P_R$ is smaller than 1. Thus, the wasted time with MIH will always be at most the same as without MIH, but for any known network that is registered to the Information Service, the wasted time will become smaller.

Figure 4:
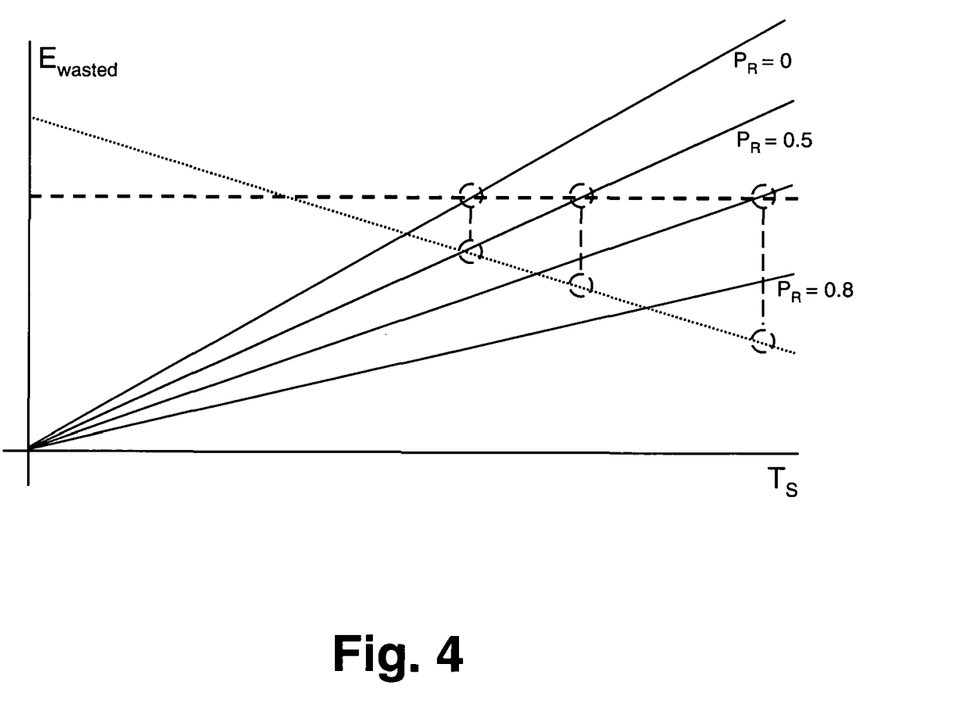
FIG. 4 is a schematic illustration giving a comparison of battery consumption and wasted time according to various scanning scenarios.

FIG. 4 illustrates the wasted time as a function of the scanning period $T_S$. Without MIH, i.e. $P_R=0$, the wasted time increases with a slope of ½ as the scanning period $T_S$ increases. In the case where $P_R$ is bigger than 0, however, the slope decreases. In other words, with a certain probability value $P_R$ bigger than 0 it is possible to reach a wasted time equal to an arbitrary threshold by employing a longer scanning period $T_S$. The arbitrary threshold is indicated by the dashed line.

Furthermore, the plot in FIG. 4 illustrates an estimate of the battery consumption, which is closely linked to the scanning period $T_S$. The more often the scanning is carried out by the terminal (small $T_S$), the more battery will be used. This effect is illustrated by the dotted line. Given an arbitrary threshold, when $P_R$ is bigger than 0, one can achieve significantly lower power consumptions than in the case where $P_R$ is 0, or there is no MIH available, respectively. Thus, if the probability $P_R$ was known, it would be possible to calculate an optimal scanning period as that which provides the same wasted time as without MIH. By equaling both equations indicated above one obtains:

$$E_{wastedMIH} = E_{wasted}$$

$$(1-P_R) \cdot T_{SMIH}/2 = T_S/2$$

$$T_{SMIH} = T_S/(1-P_R) => T_{SMIH} \geq T_S$$

This constitutes a value for the scanning time that depends on the expected threshold, given by $T_S$ and $P_R$. Using such a scanning period optimizes the usage of battery and still provides the same level of connectivity as without MIH.

The proposed formula is a simple embodiment on how $T_S$ can be calculated in relation to a target performance, provided by the wasted time without MIH. More advanced methods could consider, for instance, to allow the user to configure his scanning more aggressively (and battery consuming) by choosing a shorter scanning period, as a deviation of the optimally calculated period. In normal deployments, where the scanning period $T_S$ without MIH might not be available, the period can be calculated using a constant which is empirically adjusted. Moreover, the scanning period $T_S$ is specific to the area in which the user is at the moment. Larger or smaller areas could be considered for the purpose of the estimation of $P_R$.

Regarding a possible calculation of the probability values $P_R$, an estimation of how many of the existing networks (in a given area) MIH really knows about is conducted. In this context it is especially advantageous to provide a mechanism that enables users to upload information regarding the networks they really detect in their surrounding area. Using this information, the MIH Information Service can check if it already knows about this network, and, in the case it doesn't, keep the information.

If the Information Service is updated by messages on the part of users in the field reporting on networks, which were not yet known to the Information Service, $P_R$ will be increased, thus improving the gain in terms of lower battery consumption of scanning mobile terminals due to reduced scanning periods. By checking how many of the reported networks were already known, and how many were new, the Information Service can produce an estimate of the probability value $P_R$ and send it down to the terminals, which then will adjust their scan periods accordingly.

Figure 5:
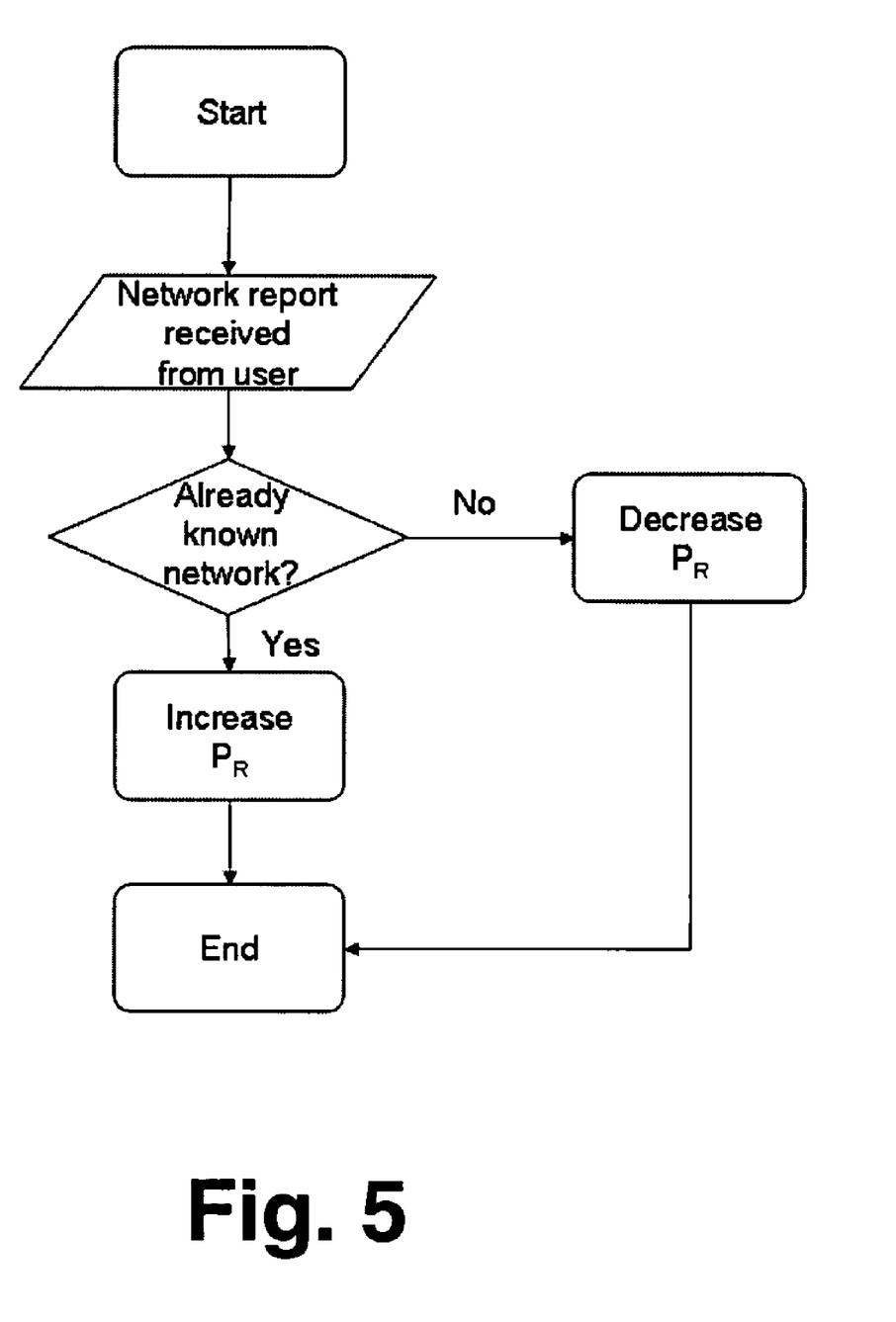
FIG. 5 is a flow diagram showing an embodiment of an algorithm to dynamically recalculate the probability $P_R$.

A basic state diagram of the algorithm running at the Information Server to calculate $P_R$ in a given area according to an exemplary embodiment is depicted in FIG. 5.

FIG. 5 just shows a simple example of how $P_R$ estimation is dynamically recalculated by the Information Server, based only in the fact of having previous knowledge or not of the network the user is uploading to the server. Additionally, more advanced algorithms can make use of further parameters in order to make the estimation of $P_R$ more accurate. For instance, when no new networks are discovered in an area over a long period of time, i.e. the Information Service doesn't receive any reports of not yet known networks, this can be interpreted as a strong hint that no networks exist further to the ones already registered to the Information Server. As a reaction, in such a case the probability value $P_R$ can steadily increase towards 1. The value can be transmitted to a user's terminal, thus enabling the user to adjust his scanning period $T_S$, in the case described by reducing $T_S$ in order to save battery power. However, if no user at all reports on available networks in the area for a long period of time, the $P_R$ should decay, to represent the lack of freshness of the information.

To further increase the accuracy of the $P_R$ estimation, terminal capabilities may be considered in the measurements, so that, for instance, extraordinarily long ranged cell phones do not report networks from distant areas, which would decrease $P_R$ although the reported network in fact is not available. In a similar way certain measurements can be conducted before a network is considered as new. By these measurements e.g. moving networks or simple spam is prevented from being reported.

The estimation of $P_R$ is specific to each area, wherein the area boundaries are established according to configurable criteria. In particular, the boundaries can be adapted from time to time. For instance, the areas for which a specific probability value is $P_R$ estimated may be broadened in case of a low density of user population (with only few user reports to the Information Service during a given time interval). Additionally, the determination of the area will depend on the positioning mechanism provided by MIH. The areas will usually be bigger than the maximum resolution of the positioning system. Furthermore, for a given area $P_R$ may be different for each of the different access technologies (Wimax, WiFi, etc. . . . ).

The mobile terminal will use the $P_R$ estimation to adapt its scanning period $T_S$. This is, as an example, for a very low $P_R$ estimation the scanning period $T_S$ will be rather high. In other words, since the mobile node knows that the knowledge of the networks around him is poor, it decides to scan very frequently searching for possible networks to connect to. On the other hand, if the $P_R$ estimation is very high, the user will drastically reduce his scanning period $T_S$, as he is already almost completely aware of the situation of available networks in his vicinity. It is to be noted that the sending of the probability value $P_R$ from the Information Service to the user terminals might include not only the current area, but also the neighbouring ones. Additionally the particular embodiment can choose whether to send an averaged $P_R$ for a large area, or rather transmit more fine grained values for a set of smaller, adjacent areas. In this context it can be provided that users are enabled to specify their individual preferences regarding the area they wish to receive information about from the Information Service.

Until now it has been assumed that the probability $P_R$ is calculated by the Information Service and is then (maybe upon a request by a user's terminal, as the case may be) transmitted from the Information Service to the terminals where the scanning period $T_S$ is optimized. This implementation is highly individualized as each terminal can calculate its own scanning period thereby taking into consideration not only the probability $P_R$ itself, but additional parameters as described above. The drawback, however, is slightly increased energy consumption on the terminal side due to the necessary calculation operation (which is, however, overcompensated by the energy savings due to the optimally adjusted scanning period). In another implementation it is also possible, that the scanning period $T_S$ is calculated in the server side and is then transmitted to the terminals.

It is important to highlight that, even though the exemplary embodiment has been explained using MIH, it is to be understood that the invention expands to any mechanism or protocol of similar functionality as MIH, which on the one hand allows for reporting network information to users and, on the other hand, allows users to upload network information based on their own network measurements.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for optimizing a scanning process of a mobile terminal, the scanning process being performed by the mobile terminal in order to discover an available network to which a connection is possible, comprising:
　　registering at least a part of existing networks to a server, wherein
　　said server provides information regarding the registered networks to the mobile terminal,
　　a scanning period of the mobile terminal is dynamically adjusted on a basis of information provided by the server,
　　a probability $P_R$ of a network to be registered in the server is estimated,
　　the mobile terminal's scanning period is determined on a basis of said estimated probability value $P_R$,
　　the estimated probability value $P_R$ is transmitted to the mobile terminal, and
　　the scanning period $T_S$ is calculated on a part of the mobile terminal on the basis of the received probability value $P_R$.

2. The method according to claim 1, wherein users are enabled to report networks to the server, the reports being employed by the server to update knowledge of existing networks, and wherein the probability $P_R$ is dynamically recalculated by the server on the basis of said network reports received from users.

3. The method according to claim 2, wherein the server employs reports on the part of users only after having performed a plausibility check according to configurable criteria.

4. The method according to claim 3, wherein the plausibility check includes a measurement to identify a network reported by a user as a moving network.

5. The method according to claim 3, wherein the plausibility check includes a measurement to check whether the server receives a configurable number of reports from different users containing the same readings within a configurable time period.

6. A method for optimizing a scanning process of a mobile terminal, the scanning process being performed by the mobile terminal in order to discover an available network to which a connection is possible, comprising:
registering at least a part of existing networks to a server, wherein
said server provides information regarding the registered networks to the mobile terminal,
a scanning period of the mobile terminal is dynamically adjusted on a basis of information provided by the server,
a probability $P_R$ of a network to be registered in the server is estimated,
the mobile terminal's scanning period is determined on a basis of said estimated probability value $P_R$,
users are enabled to report networks to the server, the reports being employed by the server to update knowledge of existing networks,
the probability $P_R$ is dynamically recalculated by the server on the basis of said network reports received from users, and
the server employs reports on the part of users only after having performed a plausibility check according to configurable criteria, and
terminal capabilities of a network reporting user are taken into consideration in the framework of the plausibility check.

7. A method for optimizing a scanning process of a mobile terminal, the scanning process being performed by the mobile terminal in order to discover an available network to which a connection is possible, comprising:
registering at least a part of existing networks to a server, wherein
said server provides information regarding the registered networks to the mobile terminal,
a scanning period of the mobile terminal is dynamically adjusted on a basis of information provided by the server,
a probability $P_R$ of a network to be registered in the server is estimated,
the mobile terminal's scanning period is determined on a basis of said estimated probability value $P_R$,
users are enabled to report networks to the server, the reports being employed by the server to update knowledge of existing networks,
the probability $P_R$ is dynamically recalculated by the server on the basis of said network reports received from users, and
the probability $P_R$ is increased by the server each time it receives a user report regarding a network of which the server had previous knowledge already, or
the probability $P_R$ is decreased each time the server receives a user report regarding a network of which the server had not yet previous knowledge.

8. A method for optimizing a scanning process of a mobile terminal, the scanning process being performed by the mobile terminal in order to discover an available network to which a connection is possible, comprising:
registering at least a part of existing networks to a server, wherein
said server provides information regarding the registered networks to the mobile terminal,
a scanning period of the mobile terminal is dynamically adjusted on a basis of information provided by the server,
a probability $P_R$ of a network to be registered in the server is estimated,
the mobile terminal's scanning period is determined on a basis of said estimated probability value $P_R$,
users are enabled to report networks to the server, the reports being employed by the server to update knowledge of existing networks,
the probability $P_R$ is dynamically recalculated by the server on the basis of said network reports received from users, and
the probability $P_R$ is steadily increased towards a value 1, if the server receives no user reports of yet unknown networks over a period of time that is either configurable or fixed or
the probability $P_R$ is decreased in the case that the server does not receive any user reports for a period of time that is either configurable or fixed.

9. A method for optimizing a scanning process of a mobile terminal, the scanning process being performed by the mobile terminal in order to discover an available network to which a connection is possible, comprising:
registering at least a part of existing networks to a server, wherein
said server provides information regarding the registered networks to the mobile terminal,
a scanning period of the mobile terminal is dynamically adjusted on a basis of information provided by the server,
a probability $P_R$ of a network to be registered in the server is estimated,
the mobile terminal's scanning period is determined on a basis of said estimated probability value $P_R$,
users are enabled to report networks to the server, the reports being employed by the server to update knowledge of existing networks,
the probability $P_R$ is dynamically recalculated by the server on the basis of said network reports received from users, and
machine learning techniques are employed to predict the amount of unknown networks.

10. The method according to claim 1, wherein the estimation of the probability $P_R$ is performed specific to a certain geographic area.

11. The method according to claim 10, wherein the individual probabilities $P_R$ for each specified area are stored by the server in a spatial database or by means of a GIS (Geoinformation Service) storage mechanism.

12. The method according to claim 10, wherein a probability $P_R$ that is valid for a certain area is also transmitted to areas neighboured to said area.

13. The method according to claim 1, wherein an individual probability $P_R$ is calculated for each of the different access technologies.

14. A method for optimizing a scanning process of a mobile terminal, the scanning process being performed by the mobile terminal in order to discover an available network to which a connection is possible, comprising:

registering at least a part of existing networks to a server, wherein said server provides information regarding the registered networks to the mobile terminal, a scanning period of the mobile terminal is dynamically adjusted on a basis of information provided by the server, a probability $P_R$ of a network to be registered in the server is estimated, the mobile terminal's scanning period is determined on a basis of said estimated probability value $P_R$, and the scanning period is calculated by the server or by an external application, and the calculated scanning period $T_S$ is transmitted to the mobile terminal, or an MIIS (Media Independent Information Service) defined in IEEE 802.21 is employed for the transmission of the probability $P_R$ value and/or the scanning period from the server to the mobile terminal by adding a new Information Element (IE) to the MIIS.

15. Method according to claim 4, wherein the plausibility check includes a measurement to check whether the server receives a configurable number of reports from different users containing the same readings within a configurable time period.

16. The method according to claim 6, wherein the estimation of the probability $P_R$ is performed specific to a certain geographic area.

17. The method according to claim 16, wherein the individual probabilities $P_R$ for each specified area are stored by the server in a spatial database or by means of a GIS (Geoinformation Service) storage mechanism.

18. The method according to claim 16, wherein a probability $P_R$ that is valid for a certain area is also transmitted to areas neighboured to said area.

19. The method according to claim 6, wherein an individual probability $P_R$ is calculated for each of the different access technologies.

* * * * *